United States Patent [19]
Young

[11] Patent Number: 5,149,255
[45] Date of Patent: Sep. 22, 1992

[54] GEARING SYSTEM HAVING INTERDIGITAL CONCAVE-CONVEX TEETH FORMED AS INVALUTES OR MULTI-FACETED POLYGONS

[75] Inventor: Neils O. Young, Boise, Id.

[73] Assignee: Arthur D. Little, Inc., Cambridge, Mass.

[21] Appl. No.: 768,196

[22] PCT Filed: Feb. 19, 1991

[86] PCT No.: PCT/US91/00990
§ 371 Date: Oct. 25, 1991
§ 102(e) Date: Oct. 25, 1991

Related U.S. Application Data
[63] Continuation-in-part of Ser. No. 481,243, Feb. 20, 1992, Pat. No. 5,051,075.

[51] Int. Cl.$^5$ .......................... F01C 1/04; F16D 3/04
[52] U.S. Cl. .................................... 418/55.3; 464/102
[58] Field of Search ............... 418/55.3; 464/102, 157; 74/63

[56] References Cited

U.S. PATENT DOCUMENTS

| | | | |
|---|---|---|---|
| 1,746,571 | 2/1930 | Williams | 74/462 |
| 1,816,273 | 7/1931 | Wildaber | 74/462 |
| 1,865,950 | 7/1932 | Petskeyes | 464/142 |
| 2,584,097 | 3/1946 | Trbojevich | 464/157 |
| 3,184,988 | 5/1965 | Osplack et al. | 74/457 |
| 4,031,781 | 6/1977 | Iida et al. | 74/804 |
| 4,200,000 | 4/1980 | Fluehmann | 74/437 |
| 4,238,970 | 12/1980 | Carter | 74/457 |
| 4,552,030 | 11/1985 | Szecsei | 74/462 |
| 4,673,342 | 6/1987 | Saegusa | 418/150 |
| 4,703,670 | 11/1987 | Kondo | 74/640 |
| 4,795,323 | 1/1989 | Lessie | 418/55.3 |
| 4,927,340 | 5/1990 | McCullough | 418/55.3 |

Primary Examiner—John J. Vrablik
Attorney, Agent, or Firm—Bacon & Thomas

[57] ABSTRACT

A gearing system includes a pair of gear support plates (5,10) arranged to rotate about parallel but offset axes (9,14) with the plates extending parallel to each other in parallel radially extending planes. Each plate includes axially extending teeth (40,45) having concave (43,45) and convex opposed surfaces. The teeth are interdigitated axially such that various pairs of interdigitated teeth will be in cooperating surface contact. Rotation of each support plate about its own axis causes the teeth to orbit relative to each other and engage in a driving relationship in a smooth manner, with the convex portion of certain teeth engaging smoothly with the concave portion of adjacent teeth. In one embodiment, the gear teeth take the form of section of lune shaped elements. In another embodiment, the gear teeth take the form of truncated involutes. In still a further embodiment, the teeth are constituted by multi-faceted polygons. The gearing system provides a 1:1 speed ratio and has application as an Oldham coupling or synchronizer for a scroll fluid device.

8 Claims, 5 Drawing Sheets

GEARING SYSTEM HAVING INTERDIGITAL CONCAVE-CONVEX TEETH FORMED AS INVALUTES OR MULTI-FACETED POLYGONS

This application is a continuation-in-part of patent application Ser. No. 07/481,243 filed Feb. 20, 1990, now U.S. Pat. No. 5,051,075, granted Sep. 24, 1991.

FIELD OF THE INVENTION

This invention relates to a gearing system for use in rotary gear drive arrangements wherein one gear (i.e. a drive gear) moves in an orbiting fashion relative to another gear (a driven gear). The invention has application as a synchronizer in, for example, scroll fluid devices.

BACKGROUND OF THE INVENTION

Gear drive systems, known in the art, having two gears that rotate in mesh but where one of the gears orbits about the other gear are generally associated with planetary gear arrangements. In planetary gear arrangements, the gears are located in a common plane. Spur or helical gears are generally used in such systems. The teeth of such gear have meshing surfaces which are most commonly portions of involute or cycloidal curves. These curves are commonly truncated by an inner and an outer radius, thus forming the teeth of the gear.

Also known in the art are scroll fluid devices. The generic term "scroll fluid devices" is applied to an arrangement of meshed, involute spiral wraps that are moved along circular translation paths in orbiting fashion relative to each other. This orbiting motion produces one or more fluid transporting or working chambers that move radially between inlet and outlet zones of the device. Such scroll devices may function as pumps, compressors, motors or expanders, depending upon their configuration, the drive system utilized and the nature of energy transferred between the scroll wraps and the fluid moving through the device.

Typically, a pair of scroll wraps will be coupled by an Oldham coupling in order to prevent relative rotational motion between the wraps. Oldham couplings have been used in the prior art between a pair of scrolls to permit one scroll to orbit in a circular path relative to the other scroll. A typical example of a scroll fluid device utilizing an Oldham coupling is illustrated in U.S. Pat. No. 4,178,143 to Thelen et al. In this example, a conventional Oldham coupling maintains a pair of co-rotating scrolls in fixed rotational relationship while permitting their relative orbital movement with respect to each other. In this sense, the Oldham coupling can be viewed as a one-to-one gear drive arrangement that accommodates relative orbital movement between the scroll wraps.

Synchronization of one scroll with respect to the other must be maintained in all scroll machines. If synchronism is lost, gas sealing is ruined and the machine can jam mechanically. In many scroll machines, a steady torque load exists between one scroll and its mate. An Oldham coupling can carry this torque load while preserving synchronization of one scroll with respect to the other. In scroll machines which by their design do not have a steady torque load, there are nonetheless residual stray torques such as from varying friction or gas loads that tends to upset the synchronization of one scroll with respect to the other. An Oldham coupling can be used to carry this stray torque load.

In co-rotating, as well as orbital scroll fluid devices in the prior art, a problem is encountered in using an Oldham coupling. An Oldham coupling consists of three parts: one part on each scroll, and a moving intermediate part that slides linearly with respect to each scroll. The necessary motion of this intermediate or loose part, creates inertia forces that are difficult to balance in either orbiting or spinning scroll machines. If it is balanced, inertia forces will nonetheless have to be carried through its sliding bearing surfaces. If it is not balanced, vibration that results from inertia forces can be reduced by minimizing its mass. But to reduce the mass of the loose part is at the expense of mechanical strength and wear life at the sliding bearing surfaces. The overall performance of a scroll machine increases with increasing rotational speed. At high rotational speeds, it is essential to keep the synchronizer as simple as possible in order minimize the number of available vibrational modes. But an Oldham coupling will always limit the rotational speed of a scroll machine because the mass of the loose part cannot be reduced farther than its strength and wear life will permit.

Other synchronizers known in the art also have speed limitations. Other known synchronizers include the use of a necklace of balls, timing belts and flexgear synchronizers. All of these known synchronizers also include loose parts in addition to the two scrolls. The loose parts of these prior synchronizers move in trajectories that are different from either scroll.

The dynamic behavior of these loose parts at high rotational speed can result in large unsteady inertia forces that cause overall vibration and noise. The loose parts can also have unwanted resonances that magnify the inertia forces to destructive levels. The number of available vibrational modes is large. The occasional and unpredictable instability and rough running of these prior synchronizers can cause a shortened and noisy life. This is especially true in unlubricated scroll machines.

Scrolls can also be synchronized by the action of pins on one scroll plate that orbit within corresponding holes in the other scroll plate. In this type of synchronizer, a third or loose part is not required. But in such synchronizers, the pressure at the contact areas, due to a torque load between the scrolls, is generally so high that only a short life can be achieved.

BRIEF SUMMARY OF THE INVENTION

The present invention provides a unique gear drive system which permits two gear units (driver and driven) to be directly inter-engaged and which permits relative orbital movement between the gears. The present invention further provides a unique inter-engaging gear teeth configuration wherein torque loads from the drive gear to the driven gear are smoothly passed from one tooth to the next. In order to accomplish this function, each intermeshing tooth includes both a concave and a convex side surface. During relative orbital motion, various teeth between the gear units will be inter-engaged such that the concave side of a tooth on one gear will contact the convex surface side of a tooth on the other gear. Due to the cooperating shapes between the gear teeth, large surface area contacts will be made between the teeth and smooth transitions between engaged teeth pairs can be accomplished.

When utilized with scroll fluid devices, the present invention provides a unique synchronizer whereby the conventional Oldham coupling is replaced by axially interdigitated gear teeth affixed to the supporting end plates of each scroll wrap. Therefore, the gear system of this invention provides synchronization without loose parts and enables operation of scroll machines at higher rotational speeds than would be possible with other synchronizers.

A synchronizer coupling in accordance with the present invention accommodates the orbital movement of a scroll wrap relative to another wrap without the need for utilizing a conventional slide ring-type synchronizer, such as is typically used in the prior art. The number of interdigitated teeth may be varied depending upon the diameter of the scroll plates and the desired thickness of each tooth. Furthermore, the contact pressure due to torque loads between the scrolls can be minimized by increasing the contact radii between the contacting gear teeth.

DETAILED DESCRIPTION OF A PREFERRED EMBODIMENT

Figure 1:
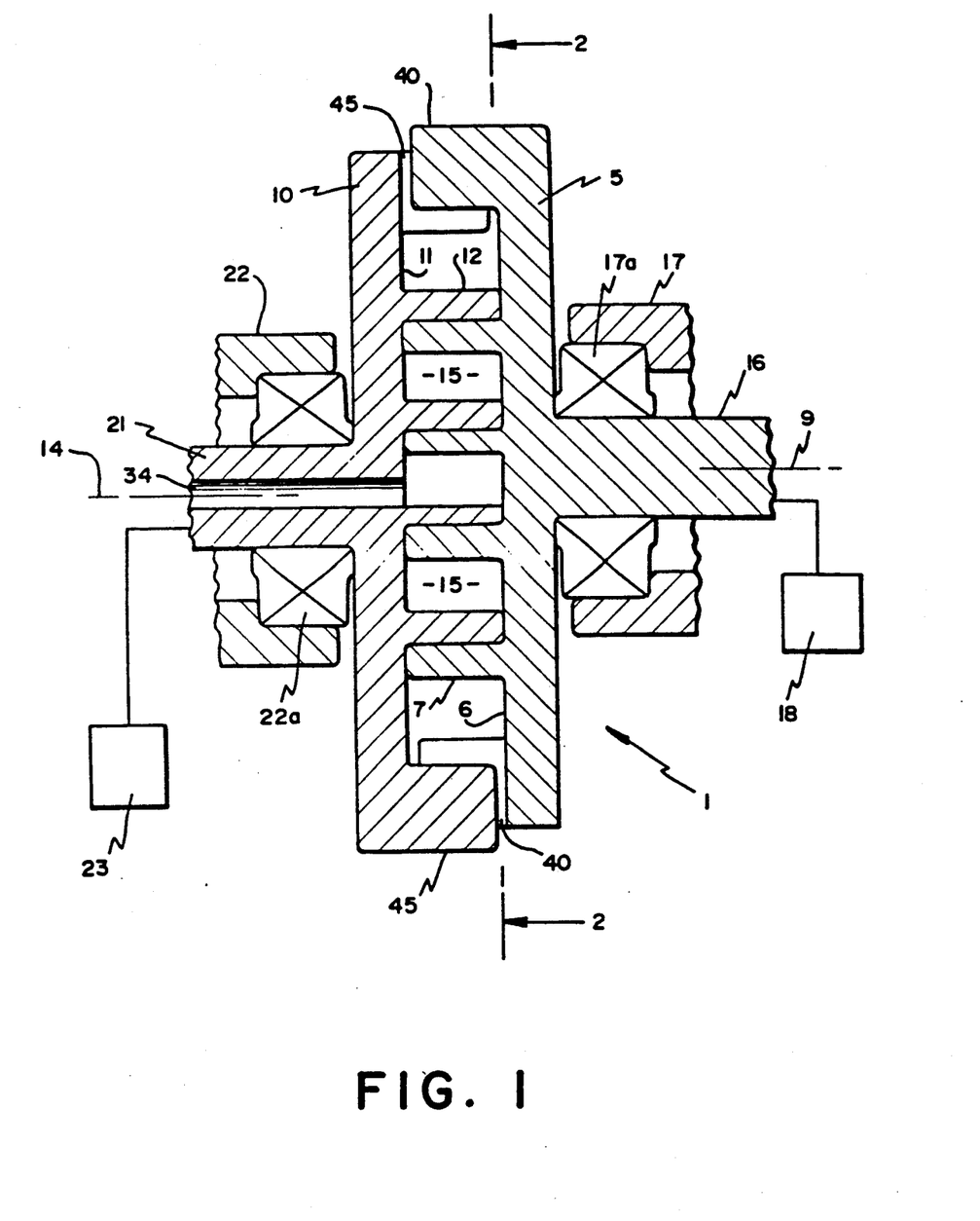
FIG. 1 is a sectional view taken essentially longitudinally through a co-rotating scroll fluid device embodying the present invention.

With reference to the accompanying drawings, the gearing system of the present invention will be described with reference to a preferred embodiment wherein the gearing system is utilized in a scroll fluid device generally indicated at 1. The scroll fluid device includes a pair of meshed involute spiral wraps 7, 12. In particular, spiral wrap 7 is either formed integral with or securely attached to inner surface portion 6 of a first wrap support plate 5, herein termed first gear support plate 5. Spiral wrap 12, in turn, is either integrally formed with or fixedly secured to inner surface portion 11 of second wrap support plate 10, herein termed second gear support plate 10.

First gear plate 5 includes a first shaft 16 which is adapted to be driven by motor 18 in order to rotate the first gear plate 5. First shaft 16 and gear plate 5 rotate about axis 9. Gear plate 5 is supported for rotation about axis 9 by means of bearings 17a held by bearing support 17. Likewise, a second shaft 21 is rotatably supported by bearings 22a held by bearing support 22 and is fixedly secured to second gear plate 10. It should be noted that bearings 17a and 22a snug close to their respective gear plates 5, 10 since radial loads originate in these areas. Both gear plates are mounted for co-rotation. As will be explained more fully below, the synchronizer arrangement in accordance with this invention transmits torque from one gear plate to another at an exact 1:1 speed ratio.

Since the synchronizer arrangement effectively transmits torque between the gear plates and permits co-rotation, second shaft 21 may or may not be driven by a separate motor. As illustrated in FIG. 1, second shaft 21 is adapted to be driven by motor 23. Shaft 21 and gear plate 10 rotate about axis 14. Axis 14 is offset from axis 9 by a distance corresponding to the radius $R_{or}$ of the orbit circle of the scroll device as clearly indicated in FIGS. 2 and 3. The bearing supports 17 and 22 may assume any appropriate form suitable for the operating conditions of the scroll fluid device. For example, bearing support 22 may be arranged so that its respective gear plate 10 may be moveable relative to gear plate 5 in a direction generally along a line connecting the axes 9 and 14 (not shown) so that one gear plate can approach the other to effectively open the working chamber between the scroll wraps to provide a loading of the wraps as is known in the art.

Defined between first scroll wrap 7 and second scroll wrap 12 are fluid chambers 15. Typically, the scroll fluid device would operate at high speed within a gaseous fluid medium surrounding the rotating scroll wraps so that, when the device is operated as compressor, fluid intake occurs at the outer end of each scroll wrap. This fluid arrives at the outer end of the scroll wraps by flowing through openings between the synchronizer gear teeth (not labeled). When functioning as a compressor, output flow through the device occurs at output port 34. Of course, it should be understood that the scroll fluid device 1 can operate as an expander by admitting pressurized fluid at port 34 and causing it to expand within the radially outwardly moving fluid chambers 15, to be discharged at the outer ends of the scroll wraps, from whence it flows through open portions between the synchronizer teeth to the environment. However, for purposes of the remainder of this description, it will be assumed that the scroll fluid device 1 illustrated is arranged to function as a compressor.

The synchronizer arrangement in accordance with this invention comprises an annular array of axially extending, equally circumferentially spaced teeth 40, 45 preferably affixed to and extending perpendicular from the outer circumferential portion of inner surface 6 and 11 of gear plate 5 and 10 respectively. Each of the gear teeth 40, 45 have a similar shape as will now be described with reference to FIGS. 2-6.

The gear assembly of the present invention is designed to transmit torques in either sense at an exact 1:1 speed ratio. To accommodate the orbiting motion, spin axis 14 of second gear plate 10 is parallel to but offset from spin axis 9 of gear plate 5 by a distance corresponding to the orbit radius of the scroll device. The gearing system makes use of the fact that a point moving in a circle will trace a circle on a disc that spins at the same speed about a parallel but offset axis. The orbit circle traced out in this way has a radius equal to the orbit radius or offset distance $R_{or}$ between the parallel spin axes 9, 14.

Figure 2:
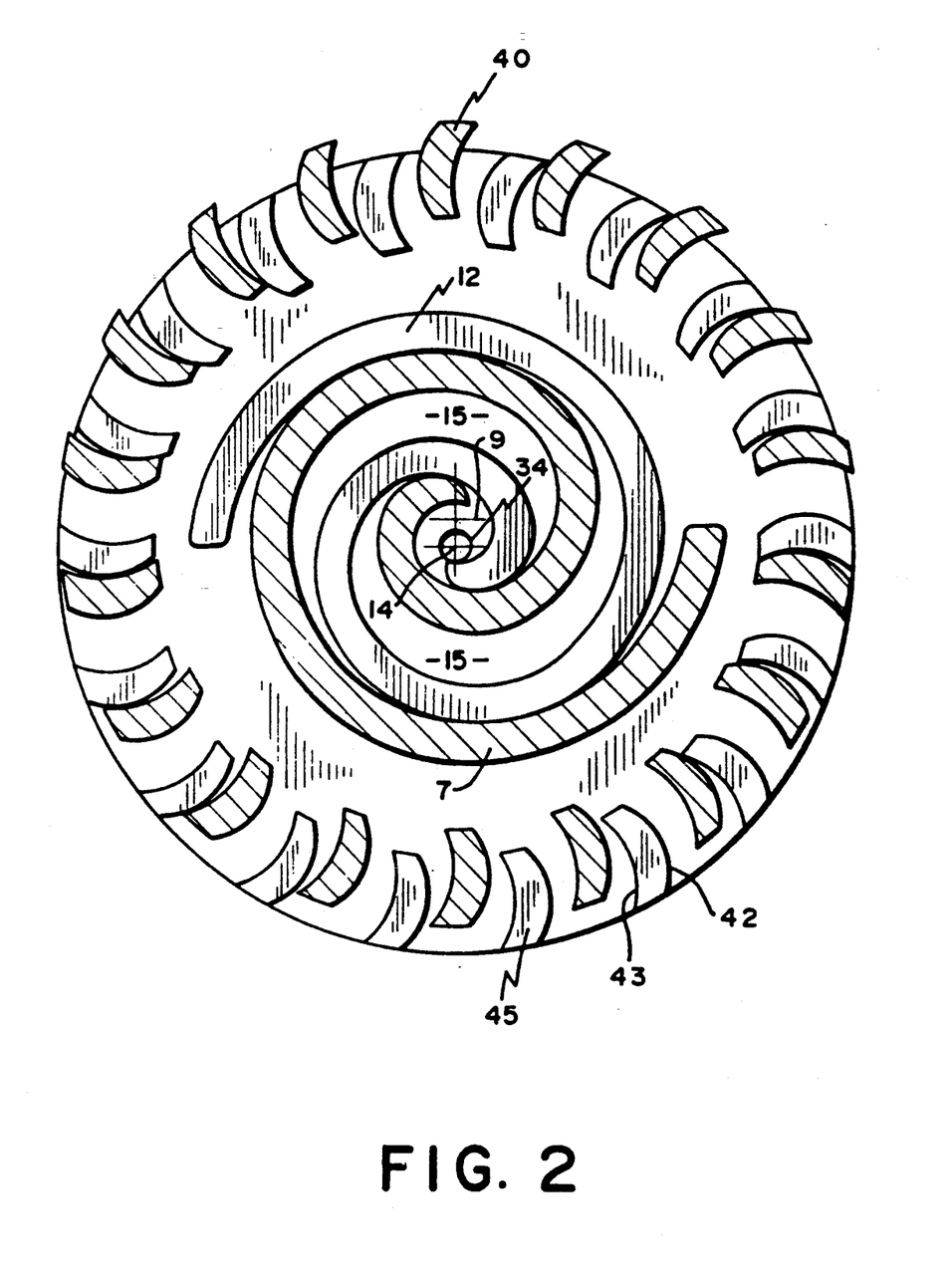
FIG. 2 is a cross sectional view taken along line 2—2 of FIG. 1 showing one embodiment of the gear teeth of the present invention.
Figure 3:
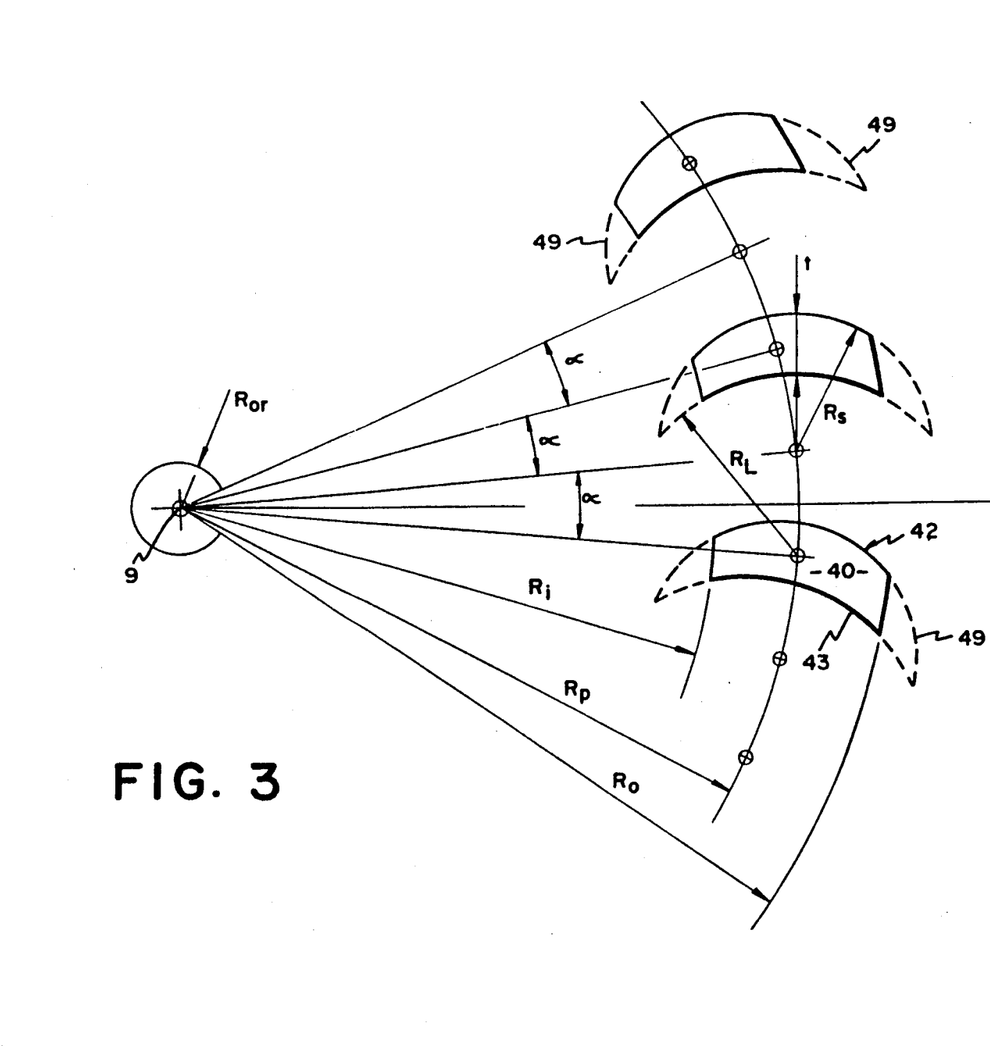
FIG. 3 represents a schematic, top view diagram of one of the gear units shown in FIG. 2.

With reference to the embodiment shown in FIGS. 2 and 3, each gear plate 5, 10 has associated therewith a pitch circle $R_p$ upon which the respective teeth 40, 45 are located. Utilizing N to equal the number of teeth on a given gear plate, the angle $\alpha$ shown in FIG. 3 is equal to 180/N. Since each tooth is substantially identical to any other tooth, the distance between corresponding points on successive teeth about the pitch circle equals an arc distance corresponding to 2 α.

Each tooth 40, 45 has a concave surface 43 of large radius $R_L$ and a convex surface 42 of smaller radius $R_S$. Therefore, the shape of each tooth 40, 45 may be fully defined by large radius $R_L$ and small radius $R_S$ and the maximum tooth thickness (t). Smaller radius $R_S$ is measured from a point along the pitch circle a distance corresponding to angle α from the point from which large radius $R_L$ is measured. Both radii $R_S$ and $R_L$ are centered on the pitch circle having a radius $R_P$. The convex and concave surfaces of two adjacent teeth on the gear plate 5 and gear plate 10 will mesh when the radius of the concave surface 43 equals the radius of the convex surface 42 plus the radius of the orbit circle. Therefore, after determining the angle o based on the desired number of teeth on a given gear plate, the desired pitch radius $R_P$ and the desired orbit circle radius $R_{or}$, the large radius $R_L$ and the smaller radius $R_S$ of each tooth 40, 45 may be calculated with respect to one another since: $R_L - R_S = R_{or}$. Furthermore, geometrically, the maximum thickness (t) of each tooth 40, 45 equals:

$$t = 2 R_p Sin(\alpha/2) - R_{or}.$$

Where:
$R_P$ = pitch radius
$R_{or}$ = orbit circle radius
α = 180/N
N = number of teeth When the two gear plates 5, 10, having equal pitch radii and teeth spacing, are designed as discussed above and mounted about parallel but offset rotational axes, the interdigitated teeth 40, 45 between gear plate 5 and gear plate 10 will smoothly mesh and effectively transmit torque therebetween. The concave and convex surface radii of each tooth 40, 45 are made as large as feasible to minimize rubbing pressure and Hertz contact stresses between any given pair of engaged teeth.

As clearly shown in FIGS. 2 and 3, each tooth 40, 45 takes the form of a truncated lune 49. The teeth are truncated in order to remove the sharp cusp portions that would not effectively carry torque loads in some cases. But with increasing truncation, the radial extent of the teeth decreases and so does the angle over which a given tooth may run in contact. Therefore truncation is designed to be moderate in order to ensure smooth transfer of contact force from one tooth to the next. However, in the spirit of the invention, each of the teeth need not be truncated but may take a lune shape as shown at 49 in FIG. 3. The outer radius $R_O$ of each gear must be significantly larger than the inner radius $R_i$. That is, the ratio $R_O/R_i$ will generally be within the range of 1.1 to 1.5, and preferably be about 1.3 as shown in FIGS. 1 and 2. This ratio ($R_O/R_i$) affects the number of teeth in mesh, contact pressure, wear rate, and other measures of gear performance.

Referring to FIGS. 1 and 2, co-rotation of the scroll wraps 7, 12 by motors 18, 23 will cause pumping of fluid trapped in chambers 15 between the peripheral regions of the wraps towards the output port 34. During rotation, each pair of interdigitated teeth 40, 45 will sequentially be engaged to maintain the wraps in their desired rotational relationship. During operation, the contact of at least one pair of teeth is always available to carry torque loads. A torque load between scrolls generally causes various contact pressures at several tooth contacts. During rotation, the contact pressure at one tooth surface will repeat cyclically once per turn. A corresponding surface of a neighboring tooth will experience the same cycle of contact pressure, but shifted by a phase angle equal to the angle 2α between the teeth. During rotation, tooth contact pressure is smoothly passed from teeth that are leaving mesh, and forward to those teeth that are entering into mesh.

Figure 4:
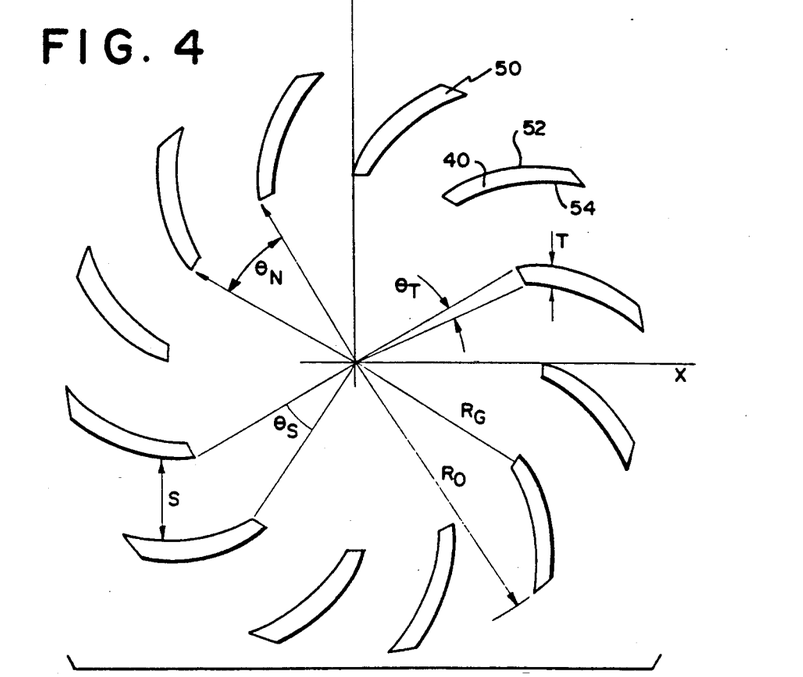
FIG. 4 represents a schematic, top view diagram similar to that shown in FIG. 3 but of a second embodiment.
Figure 5:
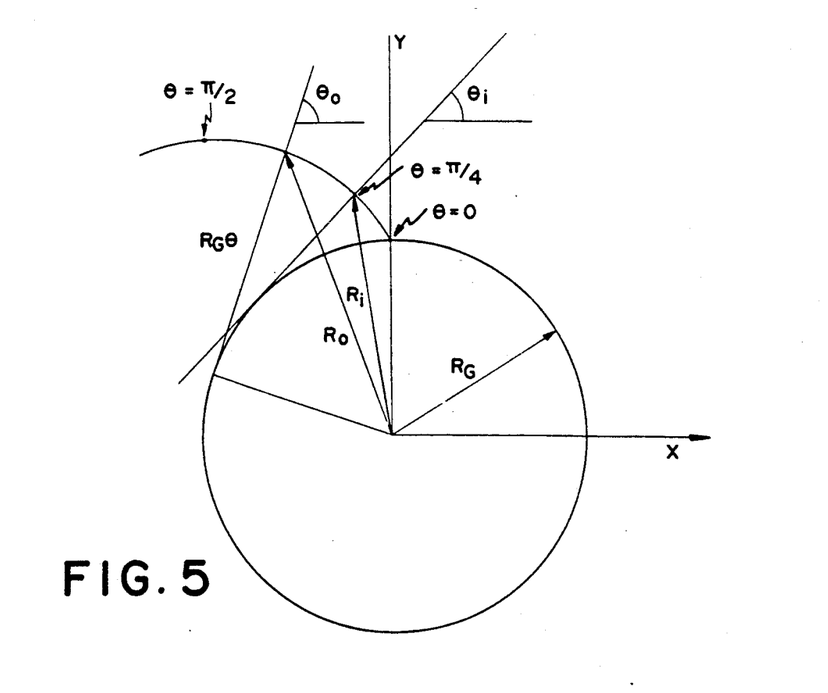
FIG. 5 is a graphic display illustrating the manner in which the gear teeth shapes according to the second embodiment are determined.

As an alternative to the embodiment shown in FIGS. 2 and 3, each of the teeth in the embodiment represented in FIGS. 4 and 5, may take the form of an involute 50. Each involute 50 includes a convex surface 52 and a concave surface 54. Although not particularly shown, the synchronizer in the embodiment shown in FIGS. 4 and 5 also includes two gears, each of which carries teeth which stand up from a circular disk and have teeth which mesh together such that a concave portion of a tooth on one disk can contact a convex portion of a tooth on the other disk in a manner directly analogous to the previous disclosed embodiment. The involute 50 of each tooth 40 is truncated at an inter-radius $R_i$ measured from the center of a circular disk as indicated in FIG. 5, and an outer radius $R_O$. The distance between involutes 50, as represented in FIG. 4, is designated S. Furthermore, the thickness of each involute 50 is designated T. As measured from the center of the gear, the distances S and T are defined by corresponding angles $\theta_S$ and $\theta_T$. Geometrically, utilizing N as equal to the number of teeth segments, the angle $\theta_n$ associated with the number of teeth segments equals:

$$\theta_N = \theta_s + \theta_t = 2\pi/N.$$

With particular reference to FIG. 5, the arc of an involute can be defined with reference to a base disk having a radius $R_G$. The outer radius $R_o$ of the involute, when taken as the hypotenuse of a right triangle at an angle of θ, and the inner radius $R_i$ can be defined in terms of the angle and the radius of the circular disk and the involute can be located along the X-Y coordinate axes according to the following equations:

$$R_i = R_G(\theta_i^2 + 1)^{\frac{1}{2}}$$

$$R_O = R_G(\theta_o^2 + 1)^{\frac{1}{2}}$$

$$X = -R_G(Sin\ \theta - Cos\ \theta)$$

$$Y = R_G(Cos\ \theta + \theta Sin\ \theta).$$

Figure 6:
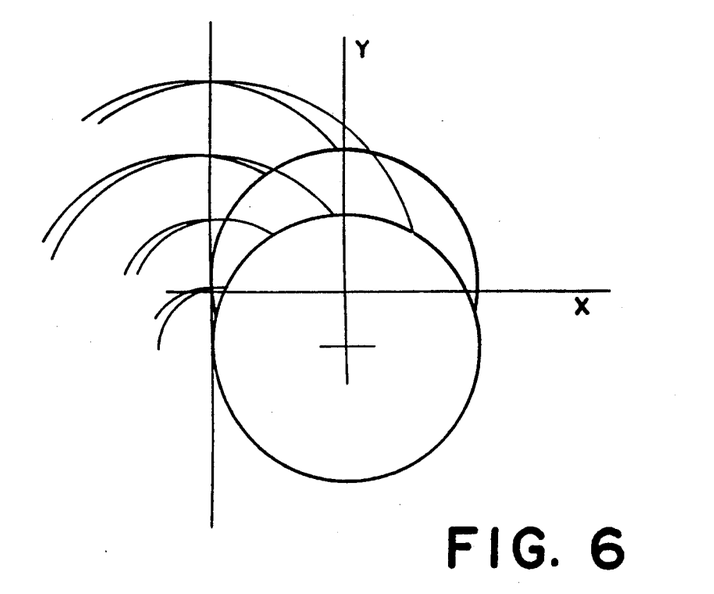
FIG. 6 further illustrates a multiple contact point characteristic associated with the second embodiment.

FIG. 6 is presented to show that the locus of gear teeth contacts using an involute teeth arrangement is a straight line that is tangent to the involute generating circle of each gear. It should be noted that FIG. 5, which was referenced to calculate the arc of an involute, is representative of a small portion of the locus of gear teeth contacts in FIGS. 6. The FIG. 6 representation is specifically presented to show that when the center-to-center distance between the spin axis of the two gears which are parallel but offset as discussed with reference to the FIGS. 2 and 3 embodiment is changed, the locus of contacts is unaffected. Therefore, the gear ratio is exactly 1:1 for any center-to-center distance within the range of 0−(S−T)/2 wherein S=the gear spacing and T=the involute teeth thickness as previously discussed with reference to FIG. 4. The fact that an exact 1:1 gear ratio for any center-to-center distance within the prescribed range exists, any type of "ripple" effect that would be encountered on the gears during operation due to development of contact stresses between the pairs of engaged teeth is greatly reduced.

Ripple may occur in some gearing systems having a ratio of 1:1. Ripple is a word expressing that the ratio, although 1:1 on the average, varies with the passage of each gear tooth. For example, the ratio may vary between the limits of 0.98:1.00 and 1.02:1.00. In this example, the ripple amplitude is 0.02. If the input gear is driven at a constant velocity, the effect of ripple is to accelerate and decelerate the driven gear at the tooth passage frequency. If there are 16 teeth on each 1:1 gear, then the driven gear would experience 16 pulses, each pulse jerking it forward and back through a small angle, per turn. In other words, the driven gear moves ahead of and behind the driver gear by a small angle, even though the gears never depart from the average ratio of 1:1. Ripple is undesireable because it creates unnecessary loads on the gear teeth and because it creates noise. Both the noise and the tooth loads due to ripple increase rapidly with angular velocity, and would limit the practical speed at which the gearing system could operate.

Figure 7:
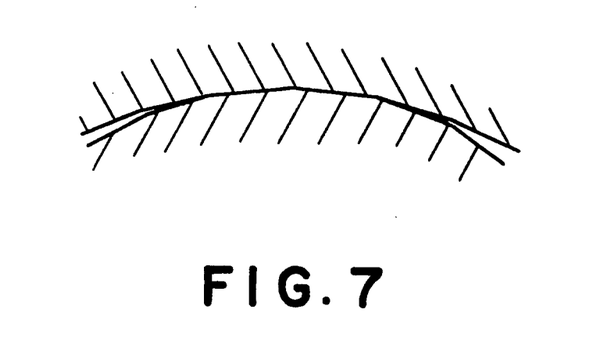
FIG. 7 is an enlarged perspective view of a pair of meshing gear teeth according to a third embodiment of the invention.

Since this invention is generally directed to providing a gear drive system between a first gear plate and a second gear plate each of which have upstanding teeth and include a convex and concave surface portion, FIG. 7 represents an enlarged tooth-to-tooth contact configuration which may also be employed within the scope of the invention. The FIG. 7 embodiment relates to a polygonal tooth synchronizer wherein the gear teeth have facets which are laid out as tangents to a circle or involute curve and include a corresponding concave and convex surface. The average gear ratio on a polygonal tooth drive arrangement is 1:1. The ripple effect, previously discussed, decreases as the angle between the facets decrease. Therefore, polygonal tooth synchronizers in approximate mesh can approximate either the lunar or involute teeth arrangements of the previous embodiments depending upon the angle between the facets corresponding to the number of sides of the polygon.

When the gear arrangement in the above described embodiments is used in a scroll fluid device, the overall housing size, nature of the cooling, and other secondary features will tend to limit the maximum diameter of each gear. The number of gear teeth is freely variable within reasonable limits. To increase the number of gear teeth to improve the performance of the gear will result in a reduction in tooth thickness. Therefore, the number of teeth has an upper limit set by secondary effects such as tooth response to torque and centrifugal loads along with the resonance of each tooth in bending and torsion.

It will be understood that although the invention is described with reference to use in scroll pump device, it is to be understood that the description is for illustrative purposes only and it is not intended that the invention be limited to the configuration of the described embodiment. The unique gearing system may be used in any environment wherein two gear plates require relative orbital movement therebetween, and it will be evident that other embodiments fully equivalent to the described and claimed examples could be constructed by those skilled in the art. Therefore, it is intended that the invention be limited only by the scope of the following claims, and not by the described examples.

We claim:

1. A gearing system for use in relative orbiting gear drive systems comprising:
   a first gear plate which is rotatable about a first axis, said first gear plate including a plurality of axially extending teeth located on and circumferentially equally spaced about a first pitch circle;
   a second gear plate which is rotatable about a second axis, parallel to and laterally spaced by a distance substantially equal to an orbit radius $R_{or}$ from said first axis, said second gear plate including a plurality of axially extending teeth located on and circumferentially equally spaced about a second pitch circle;
   said plurality of teeth on said first plate being arranged to be interdigitated with the plurality of teeth on said second plate such that relative angular displacement of one gear plate relative to the other gear plate is prevented while an orbital movement of one gear plate relative to the other gear plate is accommodated;
   each tooth on said first and second gear plates including an axially extending convex surface portion and an opposed axially extending concave surface portion such that any one pair of interdigitated teeth have a surface mesh with the convex surface portion of one tooth conforming to and engaging with the concave surface portion of the other tooth; and
   wherein all the teeth take the form of truncated involutes.

2. A scroll fluid device as claimed in claim 1, including separate driving means connected to each gear plate for rotating said gear plates.

3. A gearing system for use in relative orbiting gear drive systems comprising:
   a first gear plate which is rotatable about a first axis, said first gear plate including a plurality of axially extending teeth located on and circumferentially equally spaced about a first pitch circle;
   a second gear plate which is rotatable about a second axis, parallel to and laterally spaced by a distance substantially equal to an orbit radius $R_{or}$ from said first axis, said second gear plate including a plurality of axially extending teeth located on and circumferentially equally spaced about a second pitch circle;
   said plurality of teeth on said first plate being arranged to be interdigitated with the plurality of teeth on said second plate such that relative angular displacement of one gear plate relative to the other gear plate is prevented while an orbital movement of one gear plate relative to the other gear plate is accommodated;
   each tooth on said first and second gear plates including an axially extending convex surface portion and an opposed axially extending concave surface portion such that any one pair of interdigitated teeth have an approximate surface mesh with the convex surface portion of one tooth approximately conforming to and engaging with the concave surface portion of the other tooth; and
   wherein all of the teeth take the form of multi-faceted polygons.

4. A scroll fluid device as claimed in claim 3, including separate driving means connected to each gear plate for rotating said gear plates.

5. A scroll fluid device comprising:
   at least one pair of meshed axially extending involute spiral wraps having involute centers and defining at least one chamber between them that moves radially between an inlet zone and an outer zone when one wrap is orbited along a circular path about an orbit center relative to the other wrap;

wrap support means secured to and supporting each wrap;

means for mounting said wrap support means for enabling relative orbital motion of the wraps relative to each other about an orbit radius;

synchronizer means arranged to prevent relative rotation of one wrap relative to the other notwithstanding the orbital motion of one wrap relative to the other, said synchronizer means comprising circumferentially equally spaced, axially extending teeth affixed to each of said wrap support means along respective pitch circles with the teeth of one of said wraps being interdigitated with the teeth on the other of said wraps;

each of said teeth including an axially extending convex surface portion and an opposed axially extending concave surface portion such that any one pair of interdigitated teeth have a surface mesh with the convex surface portion of one tooth of the pair conforming to and engaging with the concave surface portion of the other tooth of the pair; and wherein all the teeth take the form of truncated involutes.

6. A scroll fluid device as claimed in claim 5, including separate driving means connected to each wrap support means for rotating said wrap support means.

7. A scroll fluid device comprising:

at least one pair of meshed axially extending involute spiral wraps having involute centers and defining at least one chamber between them that moves radially between an inlet zone and an outlet zone when one wrap is orbited along a circular path about an orbit center relative to the other wrap;

wrap support means secured to and supporting each wrap;

means for mounting said wrap support means for enabling relative orbital motion of the wraps relative to each other about an orbit radius;

synchronizer means arranged to prevent relative rotation of one wrap relative to the other notwithstanding the orbital motion of one wrap relative to the other, said synchronizer means comprising circumferentially equally spaced, axially extending teeth affixed to each of said wrap support means along respective pitch circles with the teeth of one of said wraps being interdigitated with the teeth on the other of said wraps;

each of said teeth including an axially extending convex surface portion and an opposed axially extending concave surface portion such that any one pair of interdigitated teeth have an approximate surface mesh with the convex surface portion of one tooth of the pair approximately conforming to and engaging with the concave surface portion of the other tooth of the pair; and wherein all of the teeth take the form of multi-faceted polygons.

8. A scroll fluid device as claimed in claim 7, including separate driving means connected to each gear plate for rotating said gear plates.

* * * * *